(12) United States Patent
Baldwin et al.

(10) Patent No.: US 7,194,353 B1
(45) Date of Patent: Mar. 20, 2007

(54) METHOD AND SYSTEM FOR ROUTE PLANNING OF AIRCRAFT USING RULE-BASED EXPERT SYSTEM AND THREAT ASSESSMENT

(75) Inventors: Richard Baldwin, Joplin, MO (US); Richard Francis Long, Oviedo, FL (US)

(73) Assignee: Gestalt, LLC, Camden, NJ (US)

( * ) Notice: Subject to any disclaimer, the term of this patent is extended or adjusted under 35 U.S.C. 154(b) by 0 days.

(21) Appl. No.: 11/293,321

(22) Filed: Dec. 5, 2005

Related U.S. Application Data

(60) Provisional application No. 60/632,909, filed on Dec. 3, 2004.

(51) Int. Cl.
  *G01C 21/26* (2006.01)
(52) U.S. Cl. ...................... 701/206; 701/301
(58) Field of Classification Search ................ 701/1, 701/23, 24, 25, 202, 206, 207, 212, 213, 701/300, 301; 342/65, 69; 244/3.1, 3.15
See application file for complete search history.

(56) References Cited

U.S. PATENT DOCUMENTS

| | | | |
|---|---|---|---|
| 4,812,990 A | 3/1989 | Adams et al. | |
| 4,947,350 A | 8/1990 | Murray et al. | |
| 5,086,396 A | 2/1992 | Waruszewski, Jr. | |
| 5,631,640 A | 5/1997 | Deis et al. | |
| 6,020,832 A * | 2/2000 | Jensen | 340/970 |
| 6,021,374 A * | 2/2000 | Wood | 701/301 |
| 6,334,344 B1 | 1/2002 | Bonhoure et al. | |
| 6,424,889 B1 | 7/2002 | Bonhoure et al. | |
| 6,529,821 B2 * | 3/2003 | Tomasi et al. | 701/202 |

(Continued)

FOREIGN PATENT DOCUMENTS

WO    95/19545    7/1995

OTHER PUBLICATIONS

Pathfinder, Engineering and Analysis, Frontier Technology Inc. (FTI), 2003, webpage at http://www.fti-net.com/ea/ps/pathfinder.asp, (Printed on Oct. 6, 2006).

(Continued)

*Primary Examiner*—Richard M. Camby
(74) *Attorney, Agent, or Firm*—Jones Day

(57) ABSTRACT

A method and system or determining a flight path for an aircraft between an initial point and a destination point are described. An airspace is divide into a set of grid cells, and a flight path is established between the initial point and the destination point. A cumulative threat risk value for each of the grid cells is calculated, and an allowable threat risk per grid cell is established based on a rule set. An intermediate point from which to deviate the flight path is identified based upon an analysis of the cumulative threat risk values of the grid cells, if the threat risk value of any of the grid cells intersecting the flight path exceeds the allowable threat risk. A deviation from the intermediate point to a new intermediate point is determined such that the new intermediate point has a cumulative threat risk value lower than or equal to the allowable threat risk per grid cell. The flight path is adjusted between the initial point and the destination point to pass through the new intermediate point, thereby providing a modified flight path.

23 Claims, 6 Drawing Sheets

U.S. PATENT DOCUMENTS 6,546,338 B2    4/2003  Sainthuile et al.
6,643,580 B1 *  11/2003 Naimer et al. .............. 701/206
6,816,780 B2 *  11/2004 Naimer et al. .............. 701/206
6,985,816 B2 *   1/2006 Sorrells et al. ............... 702/14

OTHER PUBLICATIONS

Mission Planning and Navigation, Engineering and Analysis, Frontier Technology Inc. (FTI), 2003, webpage at http://www.fti-net.com/ea/ps/nav.asp, (Printed on Oct. 6, 2006).

* cited by examiner

METHOD AND SYSTEM FOR ROUTE PLANNING OF AIRCRAFT USING RULE-BASED EXPERT SYSTEM AND THREAT ASSESSMENT

This application claims the benefit under 35 U.S.C. 119(e) to U.S. Provisional Patent Application No. 60/632,909, "Threat Avoidance System," filed Dec. 3, 2004, the entire contents of which are incorporated herein by reference.

BACKGROUND

1. Field of the Invention

The present invention relates to systems and methods for planning and/or adjusting aircraft routes. More particularly, the invention relates to automated systems and methods for planning and/or adjusting aircraft routes based on threats in dynamic simulation and operational environments.

2. Background Information

Militaries around the globe conduct a wide variety of training, simulation, and real-world exercises and missions involving aircraft. Personnel who plan air missions and exercises (e.g., called mission planners or mission controllers) are conventionally responsible for planning and adjusting aircraft flight paths to avoid threats so that aircraft can achieve mission and campaign objectives. Threats can include air-based, ground-based, or sea-based threats and may be man-made or naturally occurring. Typical threats include, for example, surface-to-air missiles (SAMs), enemy aircraft armed with air-to-air missiles (AAMs), mountainous terrain, and severe weather.

Various systems and methods are known in the art for routing and/or rerouting an aircraft to avoid threats. U.S. Pat. No. 4,947,350 discloses a method for determining an optimal route for minimizing the likelihood of an aircraft succumbing to a threat. An initial route is selected having a start point, an end point and a plurality of equal-length straight line segments that interconnect multiple waypoints between the start point and the end point. A routine is then implemented wherein each of the waypoints is then moved incrementally in a given direction, and the kill probability accrued by each line segment connected to a given waypoint is evaluated in turn to determine a position for that waypoint which has the lowest associated kill probability. This routine is continued until all of the waypoints have been moved in the given direction to find the optimal position of all the waypoints, thereby providing an optimized route. The routine is then repeated in the above-described manner except that the waypoints are moved in a direction at an angle (e.g., perpendicular) to the previous given direction of waypoint movement. The routine may be repeated again in the above-described manner, but with the movement of the waypoints in a direction at an angle to the previous waypoint movement (e.g., parallel to the first waypoint movement).

U.S. Pat. No. 4,812,990 discloses a method for determining the optimal path of an aircraft between a first point and a second point such that the aircraft heading at the second point is within preselected minimum and maximum heading limits. A two-dimensional reference grid is defined wherein the first point is disposed in the center cell of the first column (or "first rank") of the grid and the second point is adjacent to the center cell of the last column of the grid. The possible flight paths between the first and second points are determined, and the path of minimum cost is selected as the optimal path. The possible flight paths are constructed by identifying the possible connections between cells in the last column and the second point and then between each pair of adjacent columns, working backward from the last column to the first point, which is located in the first column. A possible connection is deemed to exist when the aircraft can fly from one point to another point and arrive at that other point within particular heading limits without exceeding the predetermined maximum lateral acceleration of the aircraft. Corresponding heading limits are determined for each connection, and all possible flight paths are examined, consistent with the preselected heading limits at the second point (e.g., the final target area) and the maximum lateral acceleration allowed for the aircraft.

U.S. Pat. No. 6,546,338 discloses a method for preparing an avoidance path in a horizontal plane so that an aircraft can resolve a conflicting route with another aircraft that involves a risk of collision occurring within 5 to 10 minutes, wherein the avoidance path minimizes the negative effects of the resultant route diversion on the flight plan of the aircraft. The threatening aircraft first takes an evasive maneuver with an initial heading relative to the threatened aircraft which is tangential, on one side or the other, to the edges of a circle of protection plotted around the threatened aircraft, wherein the radius of the circle of protection is equal to a minimum permitted separation distance. At a suitable point, the threatening aircraft then changes its heading to "home in" on the initial route. The preparation of the avoidance path can be implemented by a flight management computer, and after acceptance by the aircraft crew, the flight management computer ensures that the avoidance path is implemented by the automatic pilot.

U.S. Pat. No. 5,631,640 discloses a computer-based method wherein a previously unknown threat is detected, and a determination is made as to whether the aircraft's planned route intersects intervisibility with the treat (i.e., will make the aircraft visible to the threat). If not, the planned route is maintained. Otherwise, the aircraft route is changed depending on how far the intersection of intervisibility is from the aircraft. A route change is automatically made if the intersection is less than a predetermined distance. If the intersection is greater than the predetermined distance, the aircraft operator is notified, and the severity of the threat is checked against possible altitudes at which the aircraft is permitted to fly to determine if the planned route may be maintained at a different acceptable altitude. If a different acceptable altitude is available, the aircraft operator can maintain the planned route at the new altitude or choose the route change, such that the operator can manually respond to a threat where doing so does not endanger the aircraft.

U.S. Pat. No. 6,334,344 discloses a process for reconfiguring trajectories of airborne vehicles in real time to adapt a mission to a new situation that has arisen through the occurrence of a disrupting event. The process updates real-time context data in view of the occurrence of the disrupting event and analyzes the new real-time context to select a predefined method chosen from a set of different predefined methods stored in memory for determining a new trajectory. Each of the predefined methods directly translates operational strategies customarily employed by aircrew in a given real-time context to determine a new trajectory which best suits the current real-time context. The process executes the selected predefined method, which determines a new trajectory according to the mission data and the real-time context, and displays the new trajectory on a display, overlayed on the current trajectory. If the pilot of the airborne vehicle validates the new trajectory, the process transmits the information of this new trajectory to an automatic pilot device.

U.S. Pat. No. 6,424,889 discloses a method for generating a horizontal path for the avoidance of danger zones for an aircraft. The contours of each danger zone are modeled by a succession of connected segments. Two homing circles and two capture circles are determined, which pass respectively through the initial point and final point, are tangential respectively to the initial route and to the final route, and have respectively the initial and final turning radius of the aircraft. Tangents both to the homing circles or the capture circles and to the contour of each danger zone are determined. From these tangents, pairs of tangents to a homing circle and to a capture circle are identified that avoid danger zones are identified, thereby providing possible path skeletons connecting a homing circle to a capture circle. The shortest of the path skeletons is selected, and then the selected skeleton path is further optimized.

The present inventors have recognized a need for an automated system and method to aid mission planners in air operation centers (AOCs) to perform simultaneous rerouting of multiple aircraft on multiple flight paths, while taking into account changing threats, in order to achieve the objectives of multiple missions. Conventional automated techniques and tools are insufficient to process routing and/or rerouting for large numbers of aircraft and missions (e.g., thousands of missions) that might be controlled by an AOC. Currently, missions are handled among a large number of human mission planners, who must monitor current status of the aircraft and its mission, the intended goals, and the changing threats that might prevent those missions from being successful. Additionally, processing air tasking orders into suitable simulation orders is tedious and time-consuming for the mission planners and is prone to errors. The present inventors have recognized a need to reduce the manpower that is associated with processing routing and/or rerouting for large numbers of aircraft and missions in simulation, training (e.g., computer-aided and real-world training) and operational settings.

SUMMARY

It is an object of the invention to provide a computer-based system and method for determining flight paths for multiple aircraft involved in multiple missions and for dynamically and simultaneously rerouting the multiple aircraft based upon changes in man-made and natural threats and based upon factors such as, for example, aircraft type, mission task, sensor evasion capability, fuel range, survivability, damage condition, location, heading, altitude, speed, and restricted areas.

It is another object to reduce the human manpower needed for processing large numbers of missions involving the routing and/or rerouting large numbers of aircraft in simulation, training and operational settings and to thereby reduce mistakes.

It is another object to process large numbers of missions involving the routing and/or rerouting large numbers of aircraft in simulation, training and operational settings quickly and efficiently.

According to one exemplary embodiment, a method for establishing a flight path for an aircraft between an initial point and a destination point comprises: (a) dividing an airspace encompassing an initial point and a destination point into a plurality of grid cells; (b) identifying a flight path between the initial point and the destination point; (c) calculating a cumulative threat risk value for each of the grid cells; (d) establishing an allowable threat risk per grid cell based on a rule set; (e) identifying an intermediate point from which to deviate the flight path based upon an analysis of the cumulative threat risk values of the grid cells, if the threat risk value of any of the grid cells intersecting the flight path exceeds the allowable threat risk; (f) identifying a deviation from the intermediate point to a new intermediate point such that the new intermediate point has a cumulative threat risk value lower than or equal to the allowable threat risk per grid cell; (g) adjusting the flight path between the initial point and the destination point to pass through the new intermediate point, thereby providing a modified flight path; and (h) repeating steps (e)–(g) until each grid cell intersected by the modified flight path has a cumulative threat risk value below the allowable threat risk per grid cell, or until another stopping condition is met.

According to another exemplary embodiment, a system for establishing a flight path for an aircraft comprises a memory and a processing unit coupled to the memory, wherein the processing unit is configured to execute the above-noted method. According to another exemplary embodiment, a computer readable carrier contains executable instructions adapted to cause a computer to execute the above-noted method.

DETAILED DESCRIPTION OF EXEMPLARY EMBODIMENTS

Figure 1:
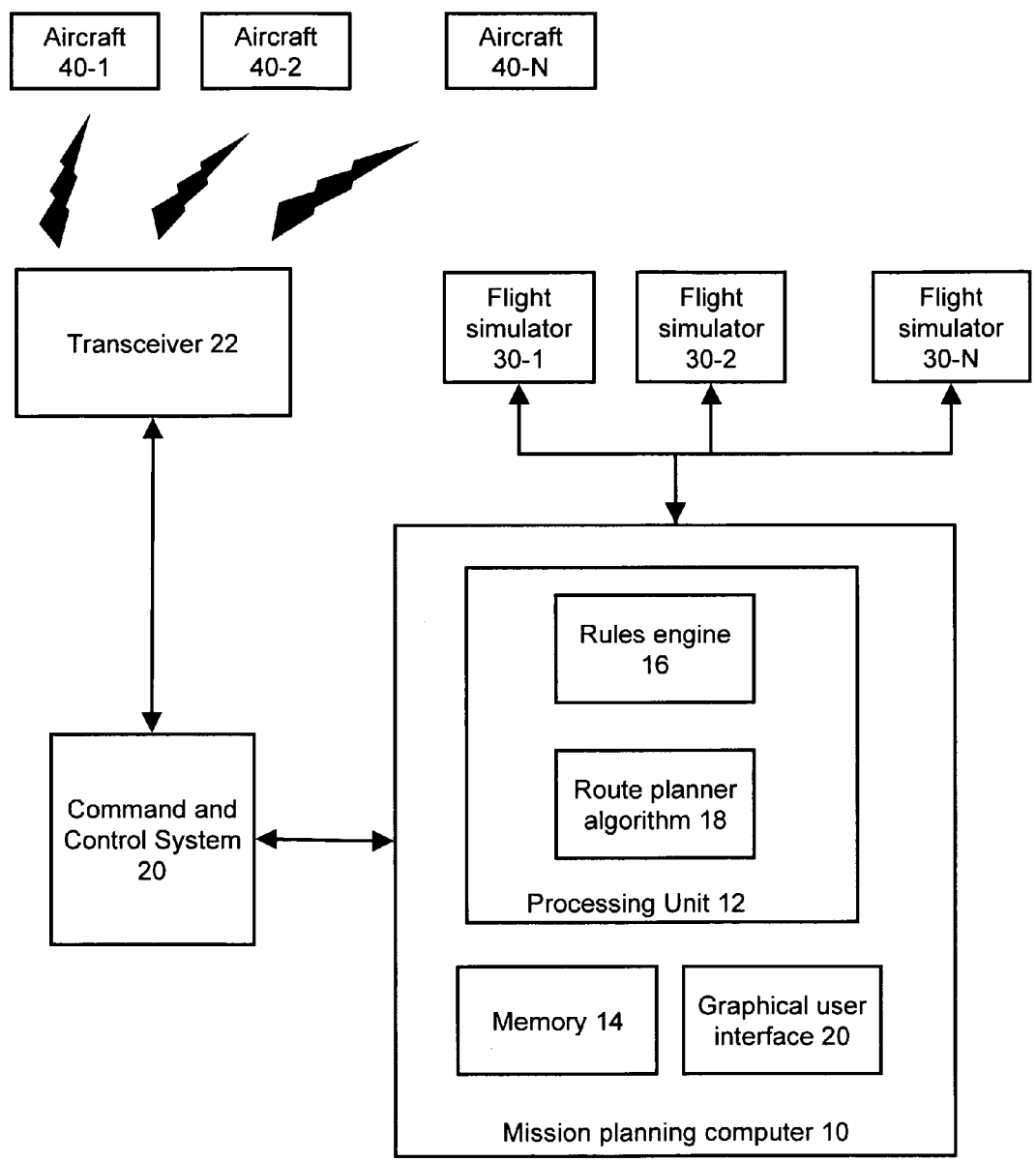
FIG. 1 illustrates a functional block diagram of a system for establishing a flight path for an aircraft according to an exemplary embodiment.

FIG. 1 illustrates a functional block diagram of an exemplary computer system 10 (e.g., a mission planning computer) programmed to establish a flight path of an aircraft using exemplary methods described herein. The computer system 10 comprises a processing unit 12 and memory 14 coupled to the processing unit. The computer system 10 can also comprise a graphical user interface 20 that can be presented to a mission planner via any suitable display unit. The processing unit 12 can comprise one or more suitable processors such as, for example, a conventional microprocessor, a high-performance microprocessor, and/or other specialized circuitry. In addition, although one processing unit 12 is illustrated in FIG. 1, the present invention can be implemented using more than one processing unit if desired. Moreover, although one computer system 10 is illustrated, multiple computer systems 10 in communication with one another could be used. The memory 102 can be any suitable memory (e.g., solid-state memory, optical memory, magnetic memory, etc.) for storing executable instructions of a computer program adapted to cause the processing unit 12 to execute the exemplary methods described herein and for storing mission and aircraft information used in connection with the exemplary methods described herein. In addition, as will be apparent to ordinary practitioners in the art, any suitable combination of hardware, software and firmware can be used to carry out the approaches described herein.

From a functional standpoint, the system 10 is programmed to function as a rule-based expert system comprising a rules engine 16 and a route planner algorithm 18. The rule-based expert system embodied in system 10 can analyze overall objectives of a campaign, examine the individual missions and aircraft assigned to those missions, check the flight plans of those missions against locations of threats before and during the mission, and plan alternate routes in order to meet the objectives of each mission while not exceeding the current capabilities of the aircraft. The rule-based expert system embodied in system 10 evaluates information, which is updated dynamically, to make decisions based on a programmed rule set. The rule set (or rules files) can be loaded into the rules engine 16 when the system 10 is initialized. Establishing a particular rule set will depend upon the objectives of the system 10 and is within the purview of one of ordinary skill in the art.

The system 10 receives information including, for example, mission tasking information, airspace information, threat event information, and constraint information from a military command and control system 20. It will be appreciated that the command and control system 20 may comprise a multiplicity of computers at one or more locations staffed by multiple personnel. Mission tasking information can include information such as mission goals, secondary goals of opportunity (if time and fuel permit), mission types, an initial point (e.g., a takeoff base), a squadron configuration, a refueling point, a destination (e.g., target) point, lead aircraft for a package of missions, waypoints associated with the flight paths of each aircraft, aircraft type, sensor evasion capability of an aircraft, current positions, headings, altitudes, speeds, damage status and survivabilities of the aircraft, armaments, and other loads carried by the aircraft. It will be apparent that the command and control system 20 can monitor the status of each mission and the status of each aircraft assigned to a given mission. As the command and control system 20 detects changes in the aircraft status, environmental status, threat status, and/or desired changes in mission tasking, it can send updated information to the system 10 in the form of new event messages.

The airspace information received by system 10 can include information relating to, for example, an airspace within which to operate, borders of countries, a kill box, operator-defined restricted areas, etc., wherein a description of the shape of an airspace can be set forth in simple geometric terms such as circles, ellipses, polygons, etc.

The threat information can include, for example, information identifying the type of threat (e.g., SAM threats, enemy aircraft armed with AAMs, mountainous terrain, severe weather, etc.), the range of the threat in three dimensions, and the lifetime of the threat. With regard to threat lifetime, some threats are permanent (e.g., a mountain peak), and some threats are intermittent or short-lived (e.g., a moving sever weather system, or a SAM which does not represent a threat during a load cycle). The aggregate information can be used to build a three-dimensional model of a battlefield with threats and restricted areas marked thereon.

Aircraft constraint information can include various types of information for an aircraft such as, for example, distance that can be flown (also referred to as range or fuel range), maximum altitude, maximum speed, minimum turning radius, etc.

As will be discussed further below in connection with FIGS. 2 and 3, based upon information received by the system 10 from the command and control system 20 (e.g., type of aircraft and type of mission), the rules engine 16 of the expert system embodied within system 10 sets allowable threat risk parameters for each aircraft associated with each of the missions. The allowable threat risk parameters can then be compared by route planner algorithm 18 embodied within the processing unit 12 to actual threat risks associated with candidate flight paths in aircraft for rerouting aircraft as needed.

The computer system 10 can be configured to communicate information to and from the command and control system 20 via any suitable interface(s) as will be appreciated by ordinary practitioners in the art. As noted above, system 10 can use information obtained from the command and control system to develop, monitor and reroute flight paths for one or more aircraft executing missions within a campaign or executing missions in a training exercise. The command and control system 20 can be coupled to a transceiver 22 such that various information can be transmitted to and received from one or more aircraft (e.g., N in number) 40-1, 40-2, . . . , 40-N. For example, the command and control system 20 can transmit updated flight path information calculated by the system 10 to the aircraft 40-1, 40-2, . . . , 40-N. In addition, the command and control system 20 can receive mission-related information from the aircraft themselves (e.g., threats neutralized, aircraft damage condition, new threat observations, etc.), and this information can then be communicated to the system 10 for carrying out updated flight path calculations. Of course, the command and control system 20 may receive the mission-related information from a variety of sources as will be apparent to those of ordinary skill in the art in addition to the aircraft themselves. However received, the information obtained by the command and control system 20 can thereby provide feedback for use by the system 10 in making modifications to flight paths. Thus, according to exemplary methods described herein, flight paths of aircraft can be adjusted dynamically in real time based upon, for example, changes in environmental conditions (e.g., weather), changes in mission conditions (e.g., aircraft damage or destruction), and changes in threats. Modified flight path information can then be transmitted from the system 10 to the command and control system 20, and thereby communicated to aircraft 40-1, 40-2, . . . , 40-N. The modified flight path information can then be reviewed and utilized by the air crews in a manual fashion, or the modified flight path information can be transmitted to flight computers on board respective aircraft for implementation by automatic pilot.

According to another exemplary embodiment, the system 10 can also be used with one or more computer-based flight simulators (e.g., N in number) 30-1, 30-2, . . . , 30-N, wherein the system 10 can be coupled to the flight simulators via any suitable interface. Information can be communicated between the system 10 and the flight simulators 30-1, 30-2, . . . , 30-N, such as described above in connection with aircraft 40-1, 40-2, . . . , 40-N. In particular, the system 10 can provide dynamic aircraft rerouting information to the flight computers of the flight simulators in a computer-based training environment for a training simulation for one or more aircraft based on an initial set of simulation data received from the command and control system 20 or from memory 14 and based upon feedback data generated by the actions of pilots in the flight simulators themselves (e.g., threats neutralized, aircraft condition, etc.).

Figure 2:
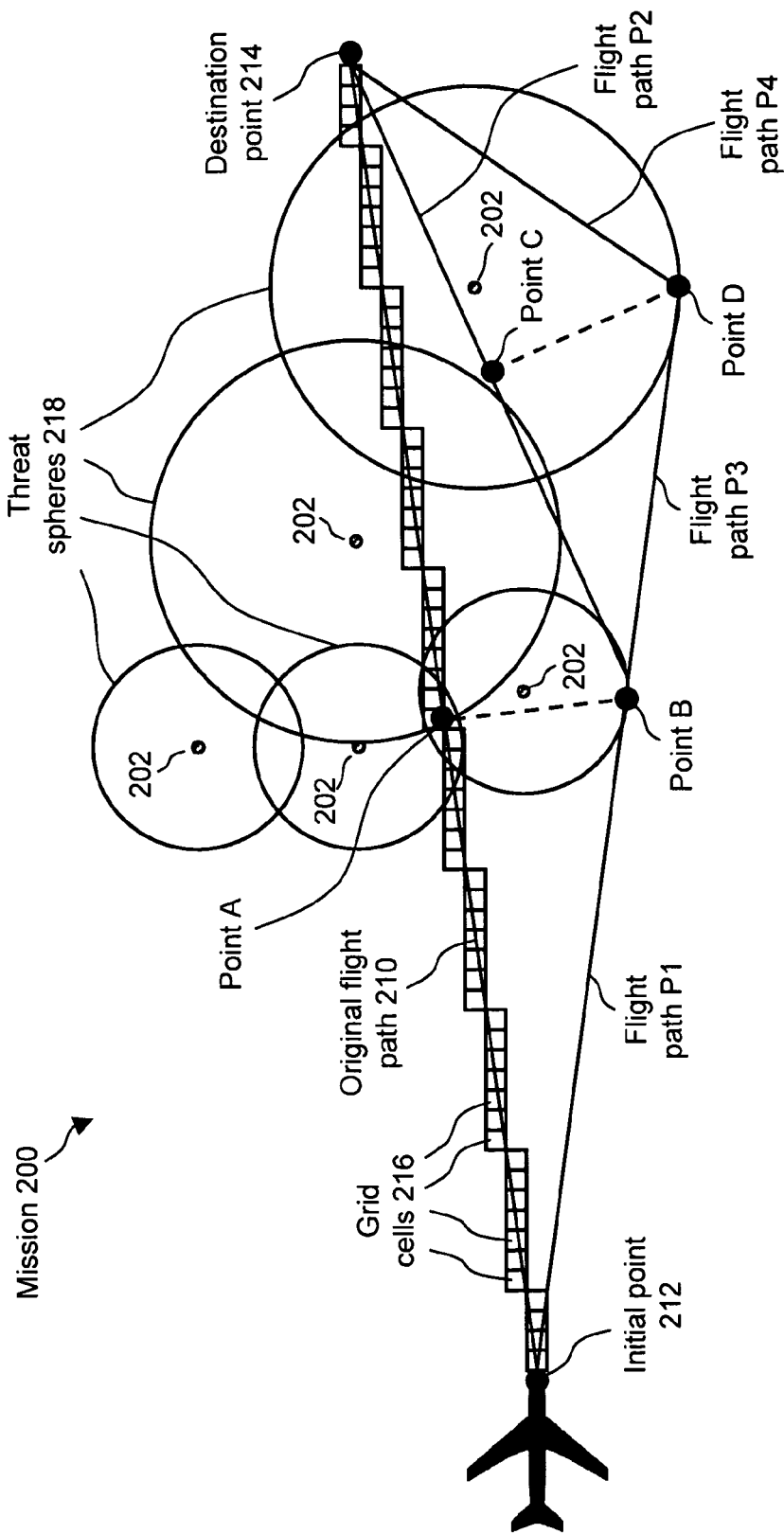
FIG. 2 schematically illustrates a map of an airspace pertinent to a mission wherein a flight path of an aircraft is modified by use of an exemplary method and system.

FIG. 2 schematically illustrates a top view of a map of showing an airspace pertinent to a mission 200 in relation to a plurality of threats 202 (e.g., ground-based SAM threats). An original flight path 210 in the example of FIG. 2 is depicted by a straight line between an initial point (e.g., takeoff point) 212 and a destination point (e.g., target point) 214. The original flight path 210, coordinates (latitude and longitude) of initial and destination points 212 and 214, cruising altitude, etc., may be received by the system 10 from the command and control system 20 as part of a mission plan for mission 200. As will be discussed later with reference to FIG. 3, a modified flight path (e.g., the combination of flights paths P1, P3 and P4) can be determined from the original flight path 210 by the system 10 of FIG. 1.

Also shown in FIG. 2 are a plurality of threat spheres 218 centered at respective threats 202. The threat spheres 218 represent the spatial extent of the risks associated with the respective threats 202. Information about the locations of the threats, their types, their lifetimes, their numerical risk measures, etc., may be received by the system 10 from the command and control system 20 as part of the mission plan for mission 200. For example, threat data for a given SAM may include its location, identification of a series of threat bands that span different altitude ranges, the maximum range of its ability to detect and acquire the target in each threat band, and the probability of kill (used as a measure of the threat level) for each threat band. A typical SAM threat might have, for example, five threat bands.

FIG. 2 further illustrates a plurality of mathematically defined grid cells 216 established by the system 10 in connection with carrying out a route planning algorithm described later herein. As will be discussed later herein, the grid cells 216 can be used to analyze threats and reroute aircraft based on the threats and based on information such as mission type and aircraft type. The grid cells 216 are established in three dimensions and can be uniform and fixed in size (e.g., 1 nautical mile, 5 nautical miles, etc.) or can be of varying size. For simplicity of illustration, only the grid cells encompassing the original flight path 210 are illustrated in FIG. 2. However, it will be appreciated that many grid cells are mathematically defined by the system 10 in three dimensions throughout the pertinent airspace associated with the mission 200. Determining the spatial extent of the pertinent airspace (also referred to as a battle airspace herein) in which to establish grid cells, and determining suitable sizes for the grid cells, are within the purview of those of ordinary skill in the art and will depend upon the particular mission at hand. For example, the distance between the initial and destination points 212 and 214, the range of the aircraft, and the required time to destination can be used to identify a maximum lateral deviation from the original flight path 210 beyond which aircraft are not expected to fly, and the maximum altitude of the aircraft can be used to set an upper vertical range on the pertinent airspace. Moreover, the grid cell size may be set based on the known and/or expected distribution of man-made threats and natural threats. For example, if the pertinent airspace is populated with many threats (or may be expected to receive such threats) separated by relatively small distances therebetween, it may be desirable to set a relatively small grid size (e.g., cubic cells 1 nautical mile on edge) over the airspace. On the other hand, if the pertinent airspace is populated, or is expected to be populated, with relatively fewer threats separated by greater distances, it may be sufficient to set a larger grid size (e.g., cubic cells 5 nautical miles on edge).

An exemplary method 300 for establishing a flight path of an aircraft will now be described in connection with FIGS. 2 and 3. It will be appreciated that the processing unit 12 of system 10 can be configured (e.g., programmed) to execute the steps of the method (e.g., based on executable instructions programmed into the processing unit). The steps described below are carried out for a given aircraft. However, it will be appreciated that the system 10 can carry out such steps simultaneously for multiple aircraft associated with multiple missions.

Figure 3:
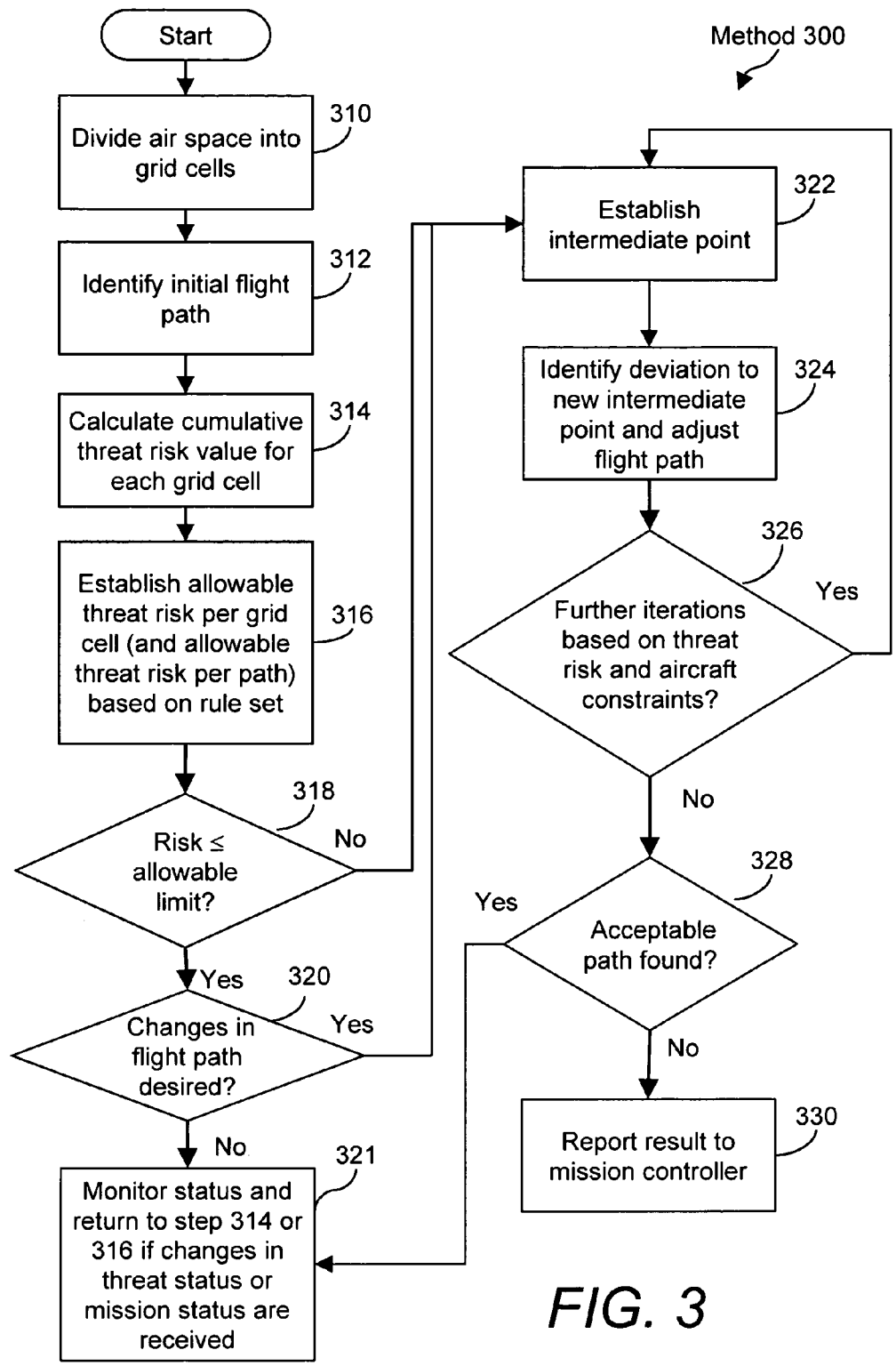
FIG. 3 illustrates a flow diagram of a method for establishing an aircraft flight path according to an exemplary embodiment.

At step 310 in FIG. 3, an airspace pertinent to a mission is divided into a plurality of grid cells, such as illustrated by grid cells 216 in FIG. 2. The spatial extent of the airspace can be determined as described previously in connection with FIG. 2 based on, for example, the locations of the initial point 212 and the destination point 214, and based on the spatial extent of allowable deviations the various aircraft may travel considering aircraft range, required time to destination, etc. As noted previously, the grid cells are established in three dimensions and can be uniform and fixed in size. For example, the grid cells may be cubic with side lengths of 1 nautical mile, 5 nautical miles, etc. The grid size can, however, be adjusted in any suitable manner appropriate for a given mission, including to be of variable size.

As shown at step 312, a flight path (which may be referred to as an initial or original flight path for convenience) for a given aircraft is identified between an initial point 212 and a destination point 214 in the airspace. This original flight path can be any suitable starting flight path including a straight line between the known initial point 212 (e.g., takeoff point) and known destination point 214 (e.g., target point), such as illustrated in FIG. 2.

At step 314, a cumulative threat risk value is then calculated for each of the grid cells 216 based on the threat contributions of one or more threats 202. In this regard, a cumulative threat risk value can be calculated for a given grid cell 216 based on the threat contributions of one or more threats 202 whose threat spheres 218 encompass the given grid cell 216. For example, the cumulative threat risk value for a given grid cell 216 can be based on all threats whose threat spheres 218 encompass the given grid cell 216, in which case the cumulative threat risk value is a total threat risk value based on all contributing threats. In this regard, multiple threat spheres 218 are illustrated in FIG. 2, and the radii of the threat spheres 218 reflect the range of the threat 202. Each type of threat 202 has at least an associated threat level (e.g., a probability of kill, a probability of damage, or some other suitable numerical indication of threat risk) and an associated range (represented in FIG. 2 by the radii of the threat spheres 218). The threat level associated with a given threat 202 may be treated as constant within the threat sphere 218 or may be treated as varying (e.g., decreasing) with distance from the threat 202. For each grid cell 216, the cumulative threat risk value for that grid cell 216 can be stored in memory 14 along with a pointer (data structure) to the memory location(s) that contain more detailed information about the various threats 202 (e.g., threat location, lifetime, threat range, threat levels, etc.).

A cumulative threat risk value for each grid cell 216 can be calculated in any suitable way. For example, if the threat level due to a given single threat 202 is represented by a probability of harm (e.g., damage or kill), a normalized threat level per grid cell due to that threat 202 can be calculated in any suitable way, e.g., based on the number of grid cells within the associated threat sphere 218. Such normalized threat levels per grid cell 216 can be calculated for all of the threats 202. The cumulative threat risk value for a given grid cell 216 impacted by multiple threats 202 can be given by the cumulative probability of harm $P_{harm}$, where $P_{harm}=1-P_{avoidance}$ and where $P_{avoidance}$ is the cumulative probability of avoiding harm for the contributing threats 202 considered. $P_{avoidance}$ is equal to the product of the individual probabilities of avoiding harm for the contributing threats 202 considered. Thus, for example, if the threat spheres 218 of two threats 202 encompass a given grid cell 216 and the normalized probabilities of harm per grid cell for those threats 202 are respectively 0.02 and 0.03, then the cumulative probability of harm for that grid cell 216 is $P_{harm}=1-(1-0.02)(1-0.03)=0.0494$. Thus, the cumulative threat risk value for that grid cell 216 can be set to 0.0494.

Alternatively, threat levels per grid cell of threats 202 can be identified in terms other than probability, e.g., using some other numerical scale such as 0 for the lowest risk of harm and 100 for the maximum risk of harm. In such a case, a threat risk value for a given grid cell 216 can be calculated by summing the threat levels per grid cell of all threats 202 whose threat spheres 218 overlap the given grid cell 216. Other ways of representing threat levels of threats 202 and of calculating threat risks values for given grid cells will be apparent to those of ordinary skill in the art.

In the case of a threat 202 characterized by multiple threat levels, various approaches can be used to calculate threat risk values for grid cells 216 impacted by such threats 202. As noted previously, threat data for a given SAM may include its location, identification of a series of threat bands that span different altitude ranges, the maximum range of its ability to detect and acquire the target in each threat band, and the probability of kill (used as a measure of the threat level) for each threat band. A typical SAM threat might have, for example, five threat bands. According to one example where the threat 202 is characterized by multiple threat levels, the system 10 can select, for example, the maximum threat level or average threat level of the multiple threat levels, and determine a threat level per grid cell from the selected level, and use that threat level per grid cell in calculating cumulative threat risk values for grid cells 216. This approach has an advantage of computational efficiency. Alternatively, the system 10 can keep track of each of the threat levels for a given threat 202 (e.g., as a function of another parameter, such as altitude), and if a given grid cell is impacted by that threat 202, the system 10 can calculate multiple cumulative threat risk values for that grid cell 216, each being associated with a given one of the multiple threat levels for the threat 202. Each of these cumulative threat risk values for that grid cell 216 will also include the contributions from other overlapping threats 202 considered. The appropriate cumulative threat risk value can then be retrieved and utilized in a rerouting calculation as described later herein depending upon which cumulative threat risk value is appropriate depending upon an aircraft parameter or condition. For example, if a given grid cell 216 has been assigned five different cumulative threat risk values because it is impacted by SAM threat having five threat bands relating to different aircraft altitudes, the cumulative threat risk value of that grid cell 216 can be selected for a given aircraft based on that given aircraft's actual altitude at that grid cell 216.

At step 316, an allowable threat risk per grid cell for a given aircraft is established by the processing unit 12 based upon a rule set. In addition an allowable threat risk per path for a given aircraft can be established by the processing unit 12 based upon the rule set, if desired. The allowable threat risk per grid cell is a maximum threat risk for any single grid cell that may be tolerated by a given aircraft. The allowable threat risk per grid cell is set by the rules engine 16 using the rule set based on information such as aircraft type, mission type, aircraft condition, range based on fuel, etc. The allowable threat risk per path is a maximum cumulative threat risk between the initial point 212 and the destination point 214 along any flight path that may be tolerated by a given aircraft. The allowable threat risk per path is set by the rules engine 16 using the rule set based on information such as aircraft type, mission type, aircraft condition, range based on fuel, etc. The allowable threat risk per grid cell and the allowable threat risk along per path may be specified in terms of a probability or some other numerical level such as described above. If desired, the rule set can provide that these allowable threat risks are to be set to zero for the first iteration of the method 300 to determine whether a zero-risk flight path can be found at the outset.

The rules engine 16 embodied within processing unit 12 can determine the allowable threat risk per grid cell and an allowable threat risk per path for a given aircraft depending upon various information such as aircraft type, mission type, aircraft condition, range based on fuel, etc. For example, a C-135 aircraft reconnaissance aircraft will avoid all threat situations, because it is slow, large, has no offensive or defensive weapons, and is typically full of jet fuel for its long-range missions. The rules engine 16 accesses the rule set and, based on the aircraft type (C-135) and the mission type (reconnaissance), establishes (e.g., retrieves or otherwise calculates) the allowable threat risk per grid cell and the allowable cumulative threat risk for that aircraft/mission. It will be appreciated that the allowable threat risks for a C-135 may be set by the rules engine 16 to be zero or relatively low. In contrast, an F-4 fighter aircraft on a "Wild Weasel" mission looks for SAM threats and will fly toward these threats, in order to eliminate them. In this case, the rules engine 16 again accesses the rule set and, based on the aircraft type (F-4) and the mission type (Wild Weasel), establishes the allowable threat risk per grid cell and the allowable threat risk per path for that aircraft/mission, both of which may be relatively high. However, if the F-4 fighter on a Wild Weasel mission suffers damage, the allowable threat risks can be reduced by the system 10 so that the system 10 can determine a safer flight path to assist the aircraft in returning to safety. As another example, if the F-4 is assigned an attack mission (a different mission type) that has specific targets, it will avoid other threats on the way to the targets so that it may reach the mission targets, and the rule engine 16 may therefore set the allowable threat risks to be zero or relatively low early in the mission and then to relatively high as the aircraft approaches the targets. This latter example illustrates that the allowable threat risks can be changed during the course of a mission depending upon changes in location, changes in aircraft condition, changes in the status of one or more missions, changes in threat conditions, etc.

Structuring the rule set to establish particular thresholds depending upon various conditions is within the purview of one of ordinary skill in the art and may be done, for example, based upon data from real world situations that are applicable to scenarios likely to be encountered, which are accordingly programmed into the rule set.

At step 318, a determination is made as to whether the threat risk for the aircraft along the flight path 210 is below an allowable limit (the cumulative threat risk value of the grid cells 216 intersecting the flight path 210 are below the allowable threat risk per grid cell). If this condition is met, the method proceeds to step 320. If, however, the cumulative threat risk value of any of the grid cells 216 intersecting the flight path 210 exceeds the allowable threat risk per grid cell, the method proceeds to step 322. In addition, a determination can be made at step 318 as to whether the cumulative threat risk along the flight path 210 exceeds the allowable threat risk per path, if desired. If either of these allowable threat risks are exceeded, the method can proceed to step 322. From a practical perspective, if both the allowable threat risk per grid cell and the allowable threat risk per path are used, the comparison to the allowable threat risk per grid cell can be done first—if the cumulative threat risk value of any of the grid cells 216 intersecting the flight path 210 exceeds the allowable threat risk per grid cell, there is no need to determine whether the cumulative threat risk along the flight path 210 exceeds the allowable threat risk per path.

If it is desired at step 318 to determine whether the cumulative threat risk along the flight path 210 exceeds the allowable threat risk per path, the cumulative threat risk along the flight path 210 must be determined. The cumulative threat risk along the flight path 210 can be determined using any suitable method. If the cumulative threat risk values for the grid cells 216 are represented using probabilities, any suitable method for accumulating probabilities can be applied to the cumulative threat risk values for the grid cells 216 that intersect the flight path 210, such as previously described above. Alternatively, if numerical threat levels other than probabilities are used to represent the cumulative threat risk values of the grid cells 216, these numerical values can simply be added together for all of the grid cells 216 intersecting the flight path 210.

If it is determined at step 318 that the risk conditions are not satisfied for the flight path 210, then the method proceeds to step 322, where a modification in flight path is initiated The flight path modification beginning at step 322 will be described later below since step 322 can also be arrived at from step 320.

Even though it may be determined at step 318 that the risk conditions do not exceed allowable limits, the method proceeds to step 320 to determine if further changes in the flight path 210 are desired. For example, it may be desired to determine if the risk to the aircraft along the flight path 210 can be further reduced. If further changes in the flight path are desired at step 320 to further reduce risk to the aircraft, the method proceeds to step 322. If the decision is made to further reduce risk to the aircraft by commencing to step 322 from step 320, the allowable threat risk per grid cell can be lowered by the system 10 (e.g., by decreasing the allowable threat risk per grid cell by a predetermined amount) so that steps 322–328 can be executed using a lower allowable threat risk per grid cell to find a modified flight path with suitably lower risk to the aircraft.

If, at step 320, no further changes in the flight path are desired, the method proceeds to step 321, wherein the mission status and threat status are monitored by receiving updated information from the command and control system 20. If changes in threat status are received, the method proceeds back to step 314 to calculate updated cumulative threat risk values for each grid cell 216, and the method continues thereafter. If changes in mission status are received but there are no changes in threat status, the method proceeds back to step 316 to establish an updated allowable threat risk per grid cell and an updated allowable threat risk per path as appropriate, and the method continues thereafter. If changes in threat status are received but no changes in mission status are received, the method can proceed from step 314 to step 318, skipping step 316.

As noted above, step 322 can be arrived at from either step 318 or 320. In either case, step 322 initiates a modification in the existing flight path 210. At step 322, an intermediate point (e.g., Point A in FIG. 2) is identified from which to deviate the flight path based upon an analysis of the threat risk values of the grid cells. The intermediate point A can be identified in a variety of ways. For example, if there is one single grid cell 216 along the flight path 210 that has a maximum cumulative threat risk value (i.e., a value greater than that of any other grid cells 216 along the flight path 210), the intermediate point A can be chosen to be at that grid cell 216 (e.g., at the center of that grid cell). As another example, if a group of contiguous grid cells 216 has the same maximum cumulative threat risk value, the intermediate point A can be chosen to be at the center of the group of grid cells 216 or next to the center.

At step 324, a deviation from the intermediate point A to a new intermediate point B is determined by the system 10 such that the new intermediate point B has a cumulative threat risk value lower than or equal to the allowable threat risk per grid cell. This deviation can be determined by identifying a direction that extends laterally (e.g., perpendicularly) from the flight path 210 at the intermediate point A and at, for example, constant altitude. For example, the direction can point either to the left or to the right in the example of FIG. 2. In this regard, FIG. 2 illustrates a dotted line extending from the intermediate point A toward the right. Grid cells 216 are examined along the direction until a grid cell 216 is found that has a cumulative threat risk value less than the allowable threat risk per grid cell. This grid cell 216 is then chosen as the new intermediate point B, and the flight path is adjusted between the initial point 212 and the destination point 214 so as to pass through the new intermediate point B, thereby providing a modified flight path. In the example of FIG. 2, the modified flight path at this stage is illustrated by the combination of two legs, namely flight path P1 and flight path P2. The new intermediate point thereby splits the previous flight path 210 into two new legs that avoid the area of highest threat.

At step 326, a determination is made whether to continue iterating through steps 322–326 to generate further flight path adjustments. Initially, this decision can be made based on criteria like that at step 318, i.e., the decision to make further iterations can be based on whether the threat risk for the aircraft along modified flight path is below an allowable limit. In particular, each leg of the modified flight path (e.g., flight path P1 and flight path P2) is analyzed to determine whether the cumulative threat risk of a given grid cell 216 along the modified flight path is below the allowable threat risk per grid cell. A determination can also be made as to whether the cumulative threat risk along the modified flight path is less than the allowable cumulative threat risk per path. If these conditions are not met, the process returns to step 322 to determine a further modification to the flight path until the threat condition(s) are satisfied. Also, a determination can be made as to whether aircraft constraints are satisfied (e.g., fuel range has not been exceeded, time to destination has not been exceeded, etc.). If, for example, at some point during the cycle of steps 322–326 it is found that aircraft constraints would be violated by a modified flight path, iterations can be carried out using deviations generated in a different direction so as to satisfy both the threat risk conditions and the aircraft constraints. At this point, it is assumed that the process has determined a candidate flight path that meets the threat condition(s) and aircraft constraints. For example, by virtue of this process, the leg labeled flight path P2 in FIG. 2 may be split into two new legs labeled flight path P3 and flight path P4 which reduces the threat risk to the aircraft to within allowable limits and satisfies aircraft constraints.

At this point, further iterations over steps 322–326 can be carried out based on threat risk and aircraft constraints using the above-noted candidate flight path as a starting point, but using different particular conditions. For example, iterations over steps 322–326 can now be carried to further adjust the flight path as long as the cumulative threat risk along the flight path is reduced at least by a predetermined amount or percentage compared to that in the previous iteration and as long as aircraft constraints are satisfied. In this case, the intermediate point can be chosen at step 322 in the same manner as described previously (e.g., selecting the intermediate point to be at or next to the grid cell having the maximum cumulative threat risk value). A new intermediate point can be chosen at step 324 differently than previously described, however, e.g., by selecting the new intermediate point at a predetermined number of grid cells laterally away from the intermediate grid cell. At each iteration, the cumulative threat risk along the modified flight path is compared to the cumulative threat risk along the flight path from the previous iteration, and iterations over steps 322–326 are continued as long as the cumulative threat risk along the flight path is reduced at least by a predetermined amount or percentage compared to that in the previous iteration and as long as aircraft constraints are satisfied. Thus, if the cumulative threat risk along the current flight path "converges" (is reduced by less than a predetermined percentage compared to that from the previous iteration), or increases compared to that from the previous iteration, a determination is made at step 326 to stop iterating. Also, if aircraft constraints would be violated by the flight path determined in an iteration, a determination is made at step 326 to stop iterating, and the modified flight path from the previous iteration can be accepted. A determination can also be made at step 326 to stop iterating if a predetermined number of iterations has been exceeded (e.g., a time out condition has occurred).

If during the "initial" iterations of steps 322–326 referred to above, the process has been unsuccessful in reducing the threat risk to below allowable limits through generating deviations at step 324 in only lateral directions (e.g., an acceptable flight path has not been found after a predetermined number of iterations by making lateral modifications to flight paths), the system 10 can then continue iterations through steps 322–326 by making vertical (i.e., altitude) adjustments combined with lateral adjustments (e.g., during different iterations) to determine suitable intermediate points and associated deviations at steps 322 and 324. In this way, the system can execute the route planning algorithm in three dimensions as opposed to simply laterally in two dimensions.

At the point of step 328, it is likely that an acceptable flight path will have been generated. However, as noted above, it is possible the iterations have been stopped because a predetermined number of iterations has been reached (e.g., a time out condition as been reached). Thus, at step 328, a determination can be made as to whether an acceptable flight path has indeed been found, e.g., based on whether the above-described threat risks are below allowable values and whether aircraft constraints are satisfied. If an acceptable path has been found, the process proceeds to step 321 described previously. If an acceptable flight path has not been found, the process proceeds to step 332, and the result is reported to the mission controller (planner) via a suitable message or alarm communicated via the mission planning computer 10.

Following step 328, another optional step can be carried out, wherein one or more of the "waypoints" (e.g., like points B and D in FIG. 2) connecting legs of the final flight path is removed such that a new straight-line flight leg is generated between the waypoints adjacent to the waypoint that was removed, thereby creating a shorter overall flight path. This new flight path is then is then assessed by calculating the cumulative threat risk per grid cell and the cumulative threat risk along the flight path to determine if they satisfy the allowable threat risk per grid cell and the allowable threat risk per path. If so, this new flight path can be accepted as the new final flight path. The removal of a given waypoint can be done at random or can be done be removing the waypoint that causes the greatest deviation of the present flight path.

According to another exemplary embodiment, the method 300 can be carried in two phases: a first phase wherein a zero-threat-risk flight path is sought for an aircraft and a second phase that is implemented if a zero-threat-risk flight path cannot be identified. As will be described below, the second phase can be implemented with more detailed information regarding specific threats, aircraft types and aircraft constraints. Returning to FIG. 3, steps 310, 312, and 314 can be carried as described previously. In particular, the cumulative threat risk value for each grid cell 216 is calculated at step 314 using values for the normalized threat level per grid cell that are constant across the threat sphere 318 for any given threat regardless of the type of aircraft. At step 316 the allowable threat risk per grid cell and the allowable threat risk per path are set to zero. The cumulative threat risk value for each grid cell 216 and the cumulative threat risk along the flight path 210 can then be calculated at step 318 to determine whether the cumulative risks are zero. If so, the process can proceed directly to step 321 since it no further changes in flight path are desired at step 320.

If a zero-threat-risk path has not been found, the process proceeds to step 322, and iterations are carried out through steps 322–326 such as described previously, except that in this case the conditions tested at step 326 are whether a zero-treat-risk flight path can be found that also satisfies aircraft constraints, examples of which have been previously described. At a certain point, e.g., when a predetermined number of iterations has been carried out without finding a zero-threat-risk flight path, the process proceeds to step 328, where it is determined that an acceptable path has not been found (because a zero-threat-risk flight path has not been found). However, instead of proceeding to step 330, the process proceeds instead back to step 312, wherein an initial flight path is identified for purposes of further executing the method 300, but under different conditions.

In particular, at step 314, the calculation of cumulative threat risk values for each grid cell 216 is carried out with more detailed information provided by the rule set of the rules engine 16. For example, rather than treating the normalized threat level per grid cell 216 as a constant across a threat sphere 218 are regardless of aircraft type, threat information is assembled by the rules engine based upon threat information whose normalized threat levels per grid cell depend upon threat type, aircraft type (e.g., because a given SAM can be more lethal to certain aircraft than others), and altitude, as well as based on other parameters that will be apparent to those of ordinary skill in the art. A SAM is a good example of a threat 202 whose threat value can depend upon such variables. Thus, it will be apparent that a given grid cell 216, even if encompassed by a single multi-level threat, such as a SAM, can have a plurality of normalized threat levels for that one threat 202, e.g., effectively a matrix of threat levels. For example, if the mission 200 contemplates a SAM threat with five threat bands depending upon altitude and contemplates 5 different aircraft types, there can be 25=5×5 different potential normalized threat levels for a given grid cell. Thus, when the cumulative threat risk "value" for a grid cell is calculated at step 314 due to the contribution of multiple threat spheres 318 at a given grid cell, under this framework the matrix of threat levels needs to be accumulated for each grid cell. The accumulation can be carried out as described elsewhere herein as will be apparent to those of ordinary skill in the art.

At step 316 an allowable threat risk per grid cell and the allowable threat risk per path are set to values different than zero by the rules engine based on the recognition that the method 300 algorithm is now operating in the "second" phase. The cumulative threat risk value for each grid cell 216 and the cumulative threat risk along the flight path can then be calculated at step 318 for the present flight path based on aircraft, altitude or other suitable parameters to determine whether the cumulative risks are less than or equal to the allowable risks.

Assuming these values are not less than or equal to the allowable risks, the method proceeds to step 322, and iterations are carried out through steps 322–326 such as described previously, except that in this case the deviation can be determined at step 324 in three dimensions—vertically as well as laterally—to take advantage of the framework that provides for varying threat levels as a function of altitude for a multi-level threat 202 such as a SAM. Iterations are carried out over steps 322–326, wherein the decision at step 326 is made by evaluating the cumulative threat risk value for each grid cell 216 and the cumulative threat risk along the flight path based on the matrix of cumulative threat risk values as described above. Further, additional constraints may be taken into account at step 326 in addition to the constraints discussed previously. In particular, considering that threat values can depend upon altitude in this framework and that deviations can be calculated at step 324 in three dimensions, candidate flight paths can further be tested against a given aircraft's minimum cruising altitude and maximum cruising altitude, as well as against other constraints.

A determination can be made at step 326 as to whether to continue iterations such as previously described, and the method can proceed to step 328 and further steps as previously described above. An advantage of this two phase approach is that it utilizes simple and efficient computations during an initial phase to seek a zero-threat-risk flight path, and only then moves on to slower, more complicated computations if a zero-treat-risk flight path is not found.

As suggested previously, the various exemplary methods described herein can be executed simultaneously for multiple aircraft or multiple flight simulators, thereby determining flight paths for multiple aircraft in either an operational/training or simulation environment. The method can also comprise communicating modified flight paths determined by the above-noted method to one or more computerized flight simulators or to one or more aircraft via a transceiver. Further, the method can comprise modifying the allowable threat risk value per grid cell for a given aircraft based on the mission status of another aircraft. Moreover, the method can comprise rerouting a given one of said multiple aircraft based on mission status of another one of said multiple aircraft.

The exemplary methods and systems described herein can have advantages to the conventional methods and systems. For example, the above described method implemented with a rule-based expert system provides a process for dynamically and simultaneously developing routes for multiple types of aircraft on multiple and different missions, in response to changing threats, aircraft status, mission tasking, and related missions within a package of missions. The flight paths can be rerouted, based on the current constraints of the aircraft, and based on assigned mission, sensor evasion capability, fuel range, survivability, damage condition, location, heading, altitude, and speed.

The exemplary rule-based expert system and method can perform many of the functions of a human mission planner, e.g., o analyze overall objectives of the campaign, examine the individual missions and aircraft assigned to those missions, check the flight plans of those missions against locations of threats before and during the mission and plan alternate routes, in order to meet the objectives of each mission, while not exceeding the current capabilities of the aircraft. The rule-based expert system can also execute such functions more quickly and efficiently substantially without the human errors associated with conventional mission planning and aircraft rerouting, which might otherwise extend an aircraft beyond its current capability or put the aircraft within the range of one or more serious threats.

Furthermore, the exemplary methods and system described herein can be used in both training and operational environments. In a training environment, the system and methods can be used by mission planners to suggest optimal planning parameters for deciding optimal flight paths, based on the type of aircraft and mission selected. The system and method can also support training by acting as a surrogate mission planner when a sufficient number of mission planners are unavailable to staff a full air operations center during a training exercise. In operational mode, the systems and methods can perform similar functions for the mission planners, by serving as a decision aid or as a surrogate, if there are an insufficient number of mission planners to support the total desired missions for the campaign.

Figure 4:
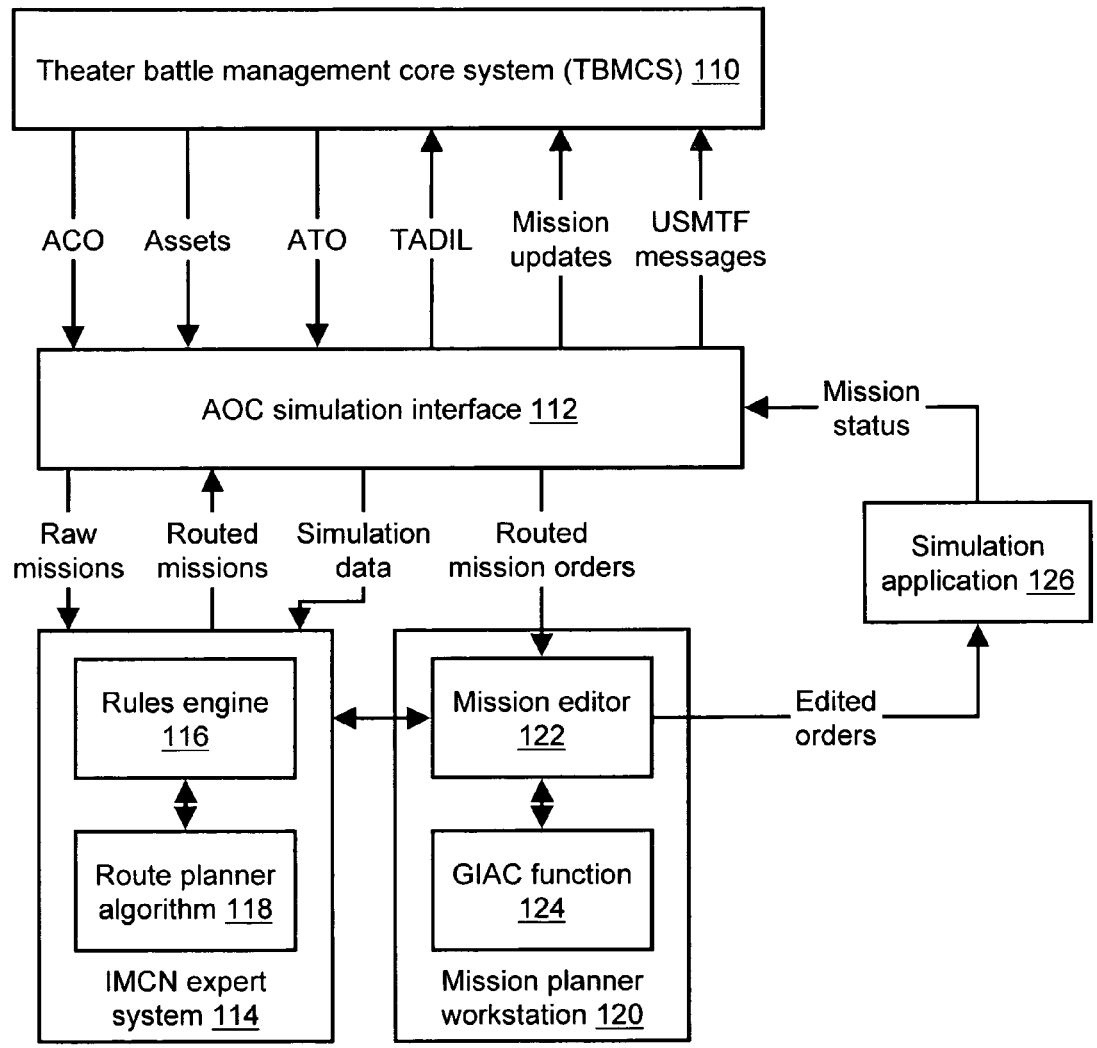
FIG. 4 illustrates a functional block diagram of a battle plan simulation system according to an exemplary embodiment.

FIG. 4 illustrates a functional block diagram of a battle plan simulation system 100 according to another exemplary embodiment. While this example is described in terms of a simulation system, it will be appreciated that the functional aspects described can be implemented in an operational setting or a training setting using actual aircraft. Battle plan simulation system 100 includes a theater battle management core system (TBMCS) 110, an air operation center (AOC) simulation interface 112, a simulation application 126, an intelligent mission controller node (IMCN) expert system 114 that further includes a rules engine 116 and a route planner algorithm 118 (such as described previously herein), and a mission planner workstation 120 that further includes a mission editor 122 and a graphical input aggregate control (GIAC) function 124. It will be appreciated that the IMCN expert system 114 can be implemented using a processing unit and a memory coupled to the processing unit, such as discussed above in connection with FIG. 1.

TBMCS 110 is a well-known command, control, communications, computer, and intelligence (C4I) system. TBMCS 110 provides the combat air forces (CAF) and the joint/combined forces with an automated and integrated capability to plan and execute the air battle plan for operations and intelligence personnel, at the force and unit levels. TBMCS 110 provides the air commander with the means to plan, direct, and control all theater air operations in support of command objectives and to coordinate with ground and maritime elements that are engaged in the same operation.

A battle plan that is generated by TBMCS 110 is transmitted to AOC simulation interface 112, via an air tasking order (ATO), in a standard United States message text format (USMTF). The ATO is an order used to task and disseminate to components, subordinate units, and command and control agencies those projected sorties/capabilities/forces to targets and specific missions. The ATO normally provides specific instructions to include call signs, targets, controlling agencies, etc., as well as general instructions, as is known to those of ordinary skill in the art.

TBMCS 110 also generates an airspace control order (ACO), which is transmitted to AOC simulation interface 112 in USMTF. The ACO is an order that implements the airspace control plan that provides the details of the approved requests for airspace control measures. It is published either as part of the air tasking order or as a separate document. The ACO defines all airspaces in a mission plan and provides the coordinates and shape for each airspace accordingly.

Additionally, TBMCS 110 provides a list of "assets" to AOC simulation interface 112. Assets cam be, for example, bases, squadrons, and ships with their associated locations.

AOC simulation interface 112 serves as the interface between TBMCS 110 and simulation application 126, IMCN expert system 114, and mission planner workstation 120. AOC simulation interface 112 performs the function of receiving all the information sources from TBMCS 110 and translating the data from TBMCS 110 into a format that is understood by simulation application 126, such as translating each individual mission into a set of order stacks that is understood by simulation application 126, as is known to those of ordinary skill in the art. Additionally, AOC simulation interface 112 performs the function of receiving "asset" information and the ACO information and attempts to resolve the information from the ATO, such as assigning a location to a mission from the airbase information and, thereby, establish a takeoff location. Having retrieved the battle plan from TBMCS 110, AOC simulation interface 112 is able to generate "raw missions" information, which is transmitted to IMCN expert system 114. Any suitable AOC simulation interface 112 can be used such as known to those of ordinary skill in the art.

A tactical digital information link (TADIL) exists between AOC simulation interface 112 and TBMCS 110. A TADIL is a Joint Staff approved, standardized communication link that is suitable for the transmission of digital information for the exchange of tactical information, as known to those of ordinary skill in the art. Additionally, AOC simulation interface 112 provides "Mission updates" and "USMTF messages" to TBMCS 110.

IMCN expert system 114 is a rule-based expert system such as described previously herein. The expert system can analyze overall objectives of the campaign, examine the individual missions and aircraft assigned to those missions, check the flight plans of those missions against locations of threats, before and during the mission, and plan alternate routes, in order to meet the objectives of each mission, while not exceeding the current capabilities of the aircraft. IMCN expert system 114 is capable of receiving mission tasking, air space definitions, IMCN operator air restriction input, and threat event messages from a military command and control system, such as TBMCS 110. IMCN expert system 114 also receives threat information from external sources, such as simulation application 126. For example, IMCN expert system 114 receives "simulation data" from simulation application 126 via AOC simulation interface 112. IMCN expert system 114 uses these messages to develop, monitor, and, simultaneously, plan the flight plans of all the aircraft that are executing the missions within a campaign.

The two basic components of IMCN expert system 114 are rules engine 116 and route planner algorithm 118. Rules engine 116 is designed to capture the domain knowledge of the mission controllers through rules and facts from AOC simulation interface 112. Mission controllers are able to add rules to the knowledge base to add realism to the missions (i.e., as the mission controllers resolve missing or incorrect battle data). Route planner algorithm 118 is the automated flight rerouting component of IMCN expert system 114, which is described in more detail in reference to FIGS. 2, 5A, and 5B.

IMCN expert system 114 receives a variety of mission tasking information, airspace information, threat event information, and constraint information such as described elsewhere herein. Rules engine 116 of IMCN expert system 114 sets weight factors (e.g., allowable threat risk per grid cell and allowable threat risk per path, such as described previously), in order for IMCN expert system 114 to identify an appropriate route behavior for the aircraft type and mission type, such as described previously herein. For example, within each grid cell along the current flight path, each threat is assessed, based on the selected aircraft and mission parameters, the ability of the threat to detect the aircraft (if a man-made threat), the probability of damaging the aircraft, the probability of completely destroying the aircraft, etc. Then, the grid cell is assigned an accumulation of the probabilities across all the threats within that cell. The grid cell also contains a reference to all of the threats and airspaces intersecting that cell, for the purpose of reasoning over airspace or threat characteristics, or to reason in three dimensions, if necessary, as described in more detail in reference to FIG. 2. The aircraft and mission selected parameters, as determined by IMCN expert system 114, are also used to determine whether the cumulative threat risk value is too high within the cell, as described in more detail in reference to FIGS. 2, 5A, and 5B.

Additionally, rules engine 116 provides aircraft constraints, such as described elsewhere herein, as input to route planner algorithm 118. Rule files (also called a rule set) are read into rules engine 116 when IMCN expert system 114 is initialized.

Mission planner workstation 120 serves as the user interface for personnel (mission controllers, also called mission planners). More specifically, mission planner workstation 120 allows the mission controller to view and modify the air mission stacks.

Mission editor 122 of mission planner workstation 120 is the user interface for the mission controllers and presents one or more graphical user interfaces (GUIs) thereto.

Mission editor 122 receives the actual orders for simulation application 126, as produced by AOC simulation interface 112, which can be presented to the mission controllers as "text order lines" in an editable mission window and, thereby, provides the mission controllers a mechanism for modifying the orders.

GIAC function 124 is the graphical component of mission planner workstation 120 that displays a graphical representation of the mission flight path, which includes, for example, a takeoff location, the combat airspace that the mission is patrolling, or a target location. GIAC function 124 can be any suitable graphical application as known to those of ordinary skill in the art that allows the mission controllers to, for example, graphically drag the waypoints of the mission flight path and graphically add or drop waypoints to the mission flight path, by use of standard drag and drop techniques. In doing so, the "text order lines" can be generated automatically as modifications occur and the modified "text order lines" appear automatically in the editable mission window of mission editor 122.

The mission controllers are tasked with verifying that each mission is correct, filling in any missing information in the mission description, and routing around threats, if necessary, before sending the mission to simulation application 126. Mission planner workstation 120 facilitates these tasks.

Simulation application 126 can be any suitable battle simulation application, such as the U.S. Air Force's air warfare simulation (AWSIM) known to those of ordinary skill in the art, which models all aspects of warfare that impact on Air Force activities, i.e., the air and ground forces that the Air Force employs and the targets and threats that it opposes. Other battle simulation applications include, for example, STAGE Scenario, developed by eNGENUITY Technologies Inc. (Montreal, Canada) and the Next Generation Threat System (NGTS), developed by the Air Force Research Laboratory known to those of ordinary skill in the art.

Additionally, simulation application 126 contains the detailed threat information for each threat in the battle space. For example, threat data for a given SAM includes its location, a series of threat bands that span different altitude ranges, the maximum range of its ability to detect and acquire the target in each threat band, and the probability of kill for each threat band, which is the likelihood that the aircraft can be acquired and that SAM will both hit and kill that aircraft.

The battle plan simulation system 100 will now be further described with reference to FIG. 2. In order to maximize threat avoidance for the aircraft's flight path, route planner algorithm 118 of IMCN expert system 114 analyzes the air space, by first dividing the space into grid cells, e.g., , a uniform set of grid cells 216 of equal size, such as described previously. Each grid cell 216 is assigned an accumulation of the probabilities across all the threats within that cell. Each grid cell 216 also contains a reference to all of the threats and airspaces intersecting that grid cell 216, for the purpose of reasoning over airspace or threat characteristics, or to reason in three dimensions, if necessary.

Then, route planner algorithm 118 of IMCN expert system 114 determines the acceptable threat risk parameters for subsequent grid cell calculations, based on, for example, the aircraft type, mission type, current condition of the aircraft, and current fuel range, such as described previously.

Should any of grid cells 216 along original flight path 210 have a cumulative threat risk value higher than the allowable threat risk per grid cell (threshold) established by the threat risk parameters, route planner algorithm 118 of IMCN expert system 114 again analyzes grid cells 216 along original flight path 210, in order to determine the an intermediate point A (see FIG. 2) at or next to the midpoint of the highest range of threat risk values, which is the most dangerous point along the flight path, such as described previously.

Route planner algorithm 118 of IMCN expert system 114 calculates a deviation of the flight path from intermediate point A. This deviation is determined by the calculation of a line that is lateral (e.g., perpendicular) to the flight path 210 at intermediate point A. Route planner algorithm 118 extends the line out, until a grid cell 216 is found that is within the acceptable threat risk parameters, as determined by route planner algorithm 118 of IMCN expert system 114, e.g., the line is extended to a new intermediate point B of FIG. 2. This new location, i.e., intermediate point B, is used to split original flight path 210 into two new flight paths that avoid this area of highest threat, such as described previously.

Grid cells 216 are then analyzed along the new flight paths P1 and P2, and should any cells 216 along the new flight paths P1 and P2 have threat risk values greater than the parameters determined by route planner algorithm 118 of IMCN expert system 114, the process is repeated for that flight path (e.g., a point C, a point D, a new flight path P3 and a new flight path P4 are generated). The overall process of grid cell analysis and the creation of new paths continue, until threat risk values along the paths are below acceptable levels, as determined by route planner algorithm 118 of IMCN expert system 114.

Figure 5A:
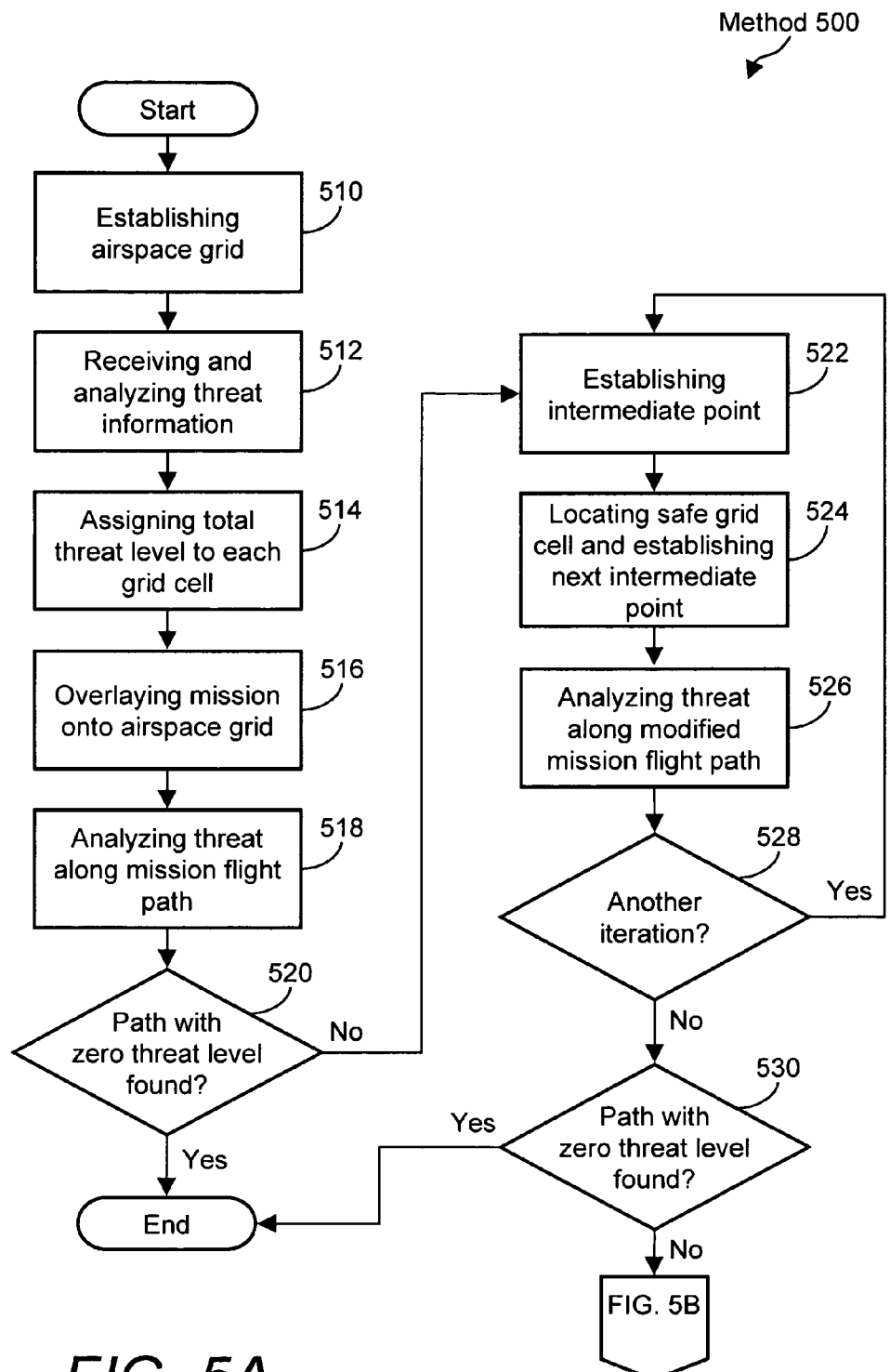
FIGS. 5A and 5B illustrate a flow diagram of a method of establishing an aircraft flight path according to another exemplary embodiment.
Figure 5B:
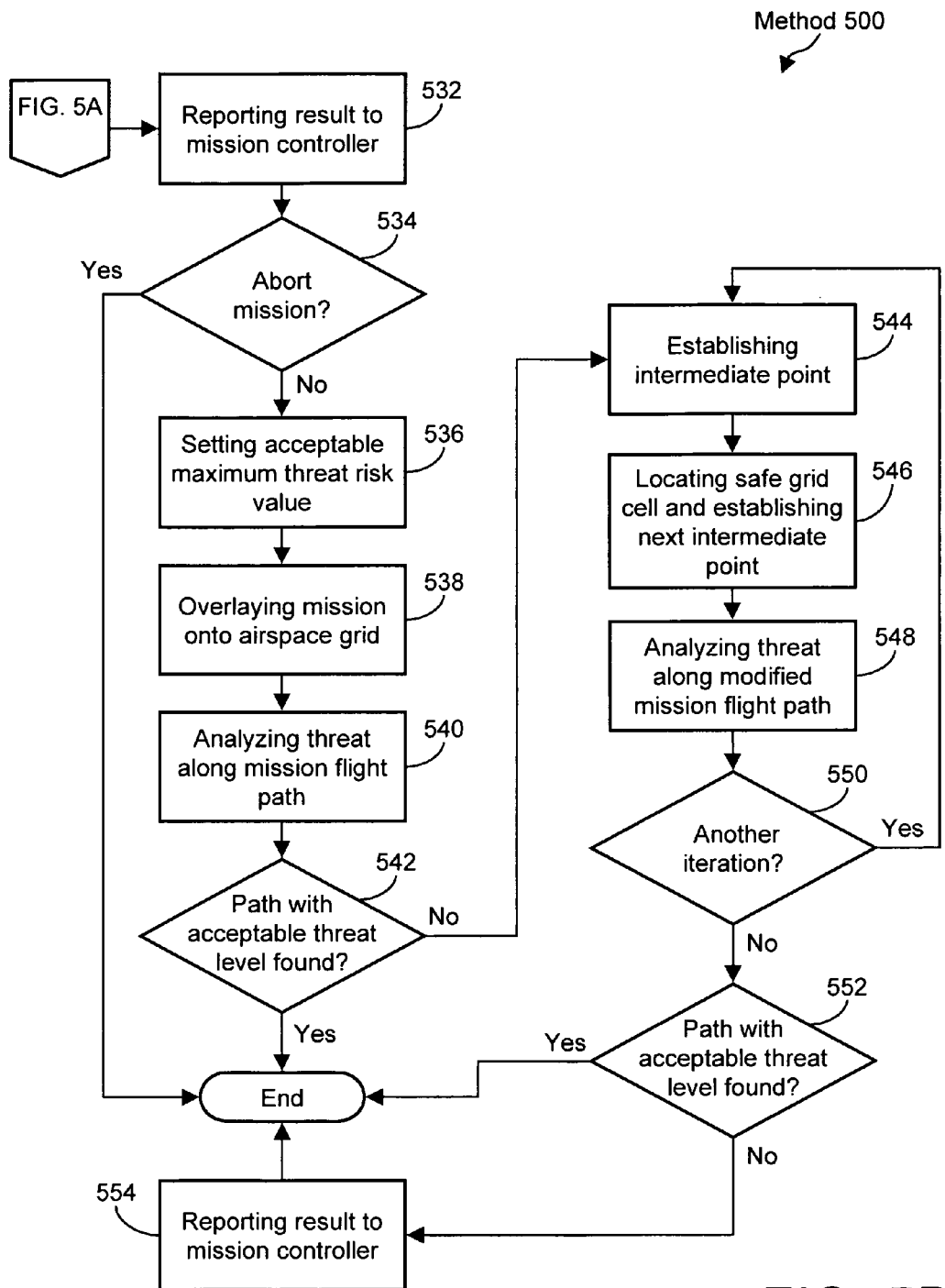

An exemplary method of using IMCN expert system 114 for performing aircraft route planning for the purpose of threat avoidance is now described in more detail in reference to FIGS. 5A and 5B. FIGS. 5A and 5B illustrate a flow diagram of a method 500 of performing aircraft route planning for the purpose of threat avoidance, by use of IMCN expert system 114 of battle plan simulation system 100 of the present invention. In a first portion of method 500, i.e., method steps 510 through 530 of FIG. 5A, route planner algorithm 118 attempts to derive a flight path that has a threat risk value of zero. In the event that no flight path with a threat risk value of zero is found, route planner algorithm 118 may, optionally, execute a second portion of method 500, i.e., method steps 532 through 554 of FIG. 5B, by use of modified threat parameters and by performing a more in-depth analysis of threat data that resides within simulation application 126. Furthermore, within battle plan simulation system 100 of the present invention, method 500 can execute for multiple aircraft simultaneously. Although typical threats include, for example, SAMs, mountainous terrain, or severe weather, for the purposes of illustration in method 500, a SAM is used to represent an exemplary threat.

At step 310 an airspace grid is established such as described previously herein, the IMCN expert system 114 analyzes the airspace, by dividing the space into a set of three-dimensional grid cells, such as grid cells 216 of FIG. 2, which may have a fixed size. For example, the default grid size may be set to 1 cubic nautical mile, but the grid size can, however, be adjusted for any exercise. At step 312, IMCN expert system 114 receives threat information from simulation application 126. More specifically, simulation application 126 provides the detailed threat information for each threat in the battle space, such as detailed information for SAMs, which has been described previously herein.

At step 514, because multiple threat spheres 218 may overlap one another upon the airspace grid, IMCN expert system 114 determines a cumulative threat risk value for each grid cell 216 within the airspace grid by accumulating normalized threat levels per grid cell for of all threat spheres 218 that impact each grid cell 216 as described previously herein. The result is a battle airspace grid, wherein each grid cell 216 has a cumulative threat risk value, which in the case of a SAM threat, represents the total probability of kill associated with that grid cell 216.

At step 516, a battle plan is received by IMCN expert system 114 from TBMCS 110 via AOC simulation interface 112 that specifies, for example, an airbase, a squadron and a target and, thus, the latitude and longitude coordinates of a takeoff point and target point for a given mission is overlaid upon the battle airspace grid. This is illustrated, for example, by mission 200 of FIG. 2, which has an original flight path 210 that is specified between takeoff point 212 and target point 214. Method 300 proceeds to step 318.

At step 518, grid cells 216 that are along the flight path 210 are analyzed by IMCN expert system 114 for cumulative threats. For example, grid cells 216 along original flight path 210, as shown in FIG. 2, are analyzed. Additionally, IMCN expert system 114 determines the acceptable threat risk parameters for the grid cell calculations, based on the aircraft type, mission type, current condition of the aircraft, current fuel range, etc.

At step 520, IMCN expert system 114 determines whether all grid cells 216 along original flight path 210 have a threat risk value of zero. If yes, the flight path is classified as safe, the result is stored and reported to the mission controller, and method 500 ends. If no, the result is stored and the flight path is classified as unsafe, and method 500 proceeds to step 522.

At step 522, because it has been determined that at least one grid cell 216 along the flight path has a cumulative threat risk value greater than zero, IMCN expert system 114 analyzes further grid cells 216 along the flight path in question, in order to determine the midpoint of the highest range of threat risk values and, thereby, establishes an intermediate point along the flight path in question. Example midpoints of the highest range of threat risk values are point A and point C of FIG. 2.

At step 524, IMCN expert system 114 calculates a deviation of the flight path from the intermediate point established in step 522. This deviation is determined by the calculation of a line that is lateral (e.g., perpendicular) to the flight path at the intermediate point established in step 522. IMCN expert system 114 extends the line out in either direction, until a grid cell 216 is found that has a threat risk value of zero. This zero threat grid cell 216 is established as a next intermediate point. Examples of such intermediate points are point B and point D of FIG. 2. This new intermediate point is used to split the flight path in question into two new flight paths that avoid this area of highest threat. For example, this is illustrated in FIG. 2 by flight paths P1 and P2, which were derived from original flight path 210, and by flight paths P3 and P4, which were derived from flight path P2.

At step 526, grid cells 216 are analyzed for cumulative threats along the new flight path by IMCN expert system 114. At step 528, if the threat risk value along the new flight path as determined in step 526 is greater than or equal to the cumulative threat risk value along the previous flight path or if the mission constraints as provided by rules engine 116 have been reached, the previous flight path is selected as the candidate minimum risk route and method 500 proceeds to step 530. However, if the threat risk value along the new flight path as determined in step 526 is less than the threat risk value calculated for the previous flight path and if the mission constraints as provided by rules engine 116 have not yet been reached, method 500 returns to step 522.

At step 530, IMCN expert system 114 determines whether all grid cells 216 along the modified flight path have a threat risk value of zero. If yes, the aircraft has been successfully rerouted for total threat avoidance, the result is stored and reported to the mission controller, and method 500 ends. If no, the aircraft has not been successfully rerouted for total threat avoidance and method 500 proceeds to step 532.

At step 522, it is reported to a mission controller, via his/her mission planner workstation 120, that the execution of method steps 510 through 528 has failed to locate a flight path that has a threat risk value of zero for the given mission.

At step 534, the mission controller decides whether to abort the mission. If yes, method 500 ends. If no, method 500 proceeds to step 536.

At step 536, the mission controller can determine an alternative acceptable maximum threat risk value per grid cell (allowable threat risk per grid cell) that is greater than zero and sets this parameter accordingly, via his/her mission planner workstation 120. This acceptable maximum threat risk value per grid cell is provided to IMCN expert system 114 as an input parameter to route planner algorithm 118.

At step 538, the mission in question from the battle plan that was received in step 316 is overlaid upon the battle airspace grid. Again referring to FIG. 2, this is illustrated, for example, by mission 200, which has an original flight path 210 that is specified between takeoff point 212 and target point 214.

At step 540, grid cells 216 along the flight path are analyzed for cumulative threats by IMCN expert system 114. For example, grid cells 216 along original flight path 210, as shown in FIG. 2, are analyzed. To accomplish this, IMCN expert system 114 examines each grid cell 216 against the list of all SAM threats, as provided by simulation application 126, and performs an in-depth analysis of this threat data. For example, IMCN expert system 114 examines all the threat bands (altitude bands) that are associated with each SAM along the flight path in question, in order to determine whether a threat band exists that has a threat risk level within the acceptable range, as set in step 336. IMCN expert system 114 classifies any grid cell 216 as safe, if it includes a safe threat band within the capability of the aircraft's minimum and maximum altitude. In this way, IMCN expert system 114 is calculating in three dimensions.

At step 542, IMCN expert system 114 determines whether all grid cells 216 along original flight path 210 have a threat risk value that does not exceed the value set in step 536. If yes, the flight path is classified as safe, the result is stored and reported to the mission controller, and method 500 ends. If no, the result is stored and the flight path is classified as unsafe, and method 500 proceeds to step 544.

At step 544, because it has been determined that at least one grid cell 216 along the flight path has a threat risk value greater than the value set in step 536, IMCN expert system 114 analyzes further grid cells 216 along the flight path in question, in order to determine the midpoint of the highest range of threat risk values and, thereby, establishes an intermediate point along the flight path in question. Example midpoints of the highest range of threat risk values are point A and point C of FIG. 2.

At step 546, IMCN expert system 114 calculates a deviation of the flight path from the intermediate point established in step 544. This deviation is determined by the calculation of a line lateral (e.g., perpendicular) to the flight path at the intermediate point established in step 544. IMCN expert system 114 extends the line out in either direction, until a grid cell 216 is found that has a cumulative threat risk value at or below the value set in step 536. This threat grid cell 216 is established as a next intermediate point. Examples of such points are point B and point D of FIG. 2. This new intermediate point is used to split the flight path in question into two new flight paths that avoid this area of highest threat. For example, this is illustrated in FIG. 2 by flight paths P1 and P2, which were derived from original flight path 210, and by flight paths P3 and P4, which were derived from flight path P2. Method 300 proceeds to step 348.

At step 548 grid cells 216 are analyzed for cumulative threats along the new flight paths by IMCN expert system 114. At step 550, if the cumulative threat risk value along the new flight path as determined in step 548 is greater than or equal to that calculated for the previous flight path or if the mission constraints as provided by rules engine 116 have been reached, the previous flight path is selected as the candidate minimum risk route and method 500 proceeds to step 552. However, if the threat risk value along the new flight path as determined in step 548 is less than that calculated for the previous flight path and if the mission constraints as provided by rules engine 116 have not yet been reached, method 500 returns to step 544.

At step 552, IMCN expert system 114 determines whether all grid cells 216 along the modified flight path have a threat risk value that does not exceed the value set in step 336. If yes, the aircraft has been successfully rerouted, the result is stored and reported to the mission controller, and method 500 ends. If no, the aircraft has not been successfully rerouted and method 500 proceeds to step 554.

At step 554, it is reported to a mission controller, via his/her mission planner workstation 120, that the execution of method steps 544 through 550 has failed to locate a flight path for the given mission that has a threat risk value that does not exceed the value set in step 536. Method 500 ends.

In another exemplary aspect of the present invention, there is provided a computer-readable carrier containing a computer program adapted to cause a computer to execute the exemplary methods described herein. In this regard, the computer-readable carrier can be, for example, solid-state memory, magnetic memory such as a magnetic disk, optical memory such as an optical disk, a modulated wave (such as radio frequency, audio frequency or optical frequency modulated waves), or a modulated downloadable bit stream that can be received by a computer via a wired or wireless network connection.

The invention has been described with reference to exemplary embodiments. However, it will be readily apparent to those skilled in the art that it is possible to embody the invention in specific forms other than those of the embodiments described above. Variations will be apparent to those of ordinary skill in the art. For example, the ordering of the steps 310–316 in FIG. 3 can be changed in various ways, and the method of FIG. 3 could be implemented using a computer within an aircraft to determine modified flight paths for that aircraft. This can be done without departing from the spirit of the invention. The embodiments described herein are merely illustrative and should not be considered restrictive in any way. The scope of the invention is given by the appended claims, rather than the preceding description, and all variations and equivalents which fall within the range of the claims are intended to be embraced therein.

What is claimed is:

1. A method for determining a flight path for an aircraft between an initial point and a destination point, comprising:
    (a) dividing an airspace encompassing an initial point and a destination point into a plurality of grid cells;
    (b) identifying a flight path between the initial point and the destination point;
    (c) calculating a cumulative threat risk value for each of the grid cells;
    (d) establishing an allowable threat risk per grid cell based on a rule set;
    (e) if the threat risk value of any of the grid cells intersecting the flight path exceeds the allowable threat risk per grid cell, identifying an intermediate point from which to deviate the flight path based upon an analysis of the cumulative threat risk values of the grid cells;
    (f) identifying a deviation from the intermediate point to a new intermediate point such that the new intermediate point has a cumulative threat risk value lower than or equal to the allowable threat risk per grid cell;
    (g) adjusting the flight path between the initial point and the destination point to pass through the new intermediate point, thereby providing a modified flight path; and
    (h) repeating steps (e)–(g) until each grid cell intersected by the modified flight path has a cumulative threat risk value below the allowable threat risk per grid cell, or until another stopping condition is met.

2. The method of claim 1, wherein:
    step (b) further comprises calculating a cumulative threat risk along the flight path based upon the threat risk values of the grid cells that intersect the flight path;
    step (d) further comprises establishing an allowable threat risk per path based upon the rule set;
    step (e) comprises identifying an intermediate point from which to deviate the flight path based upon an analysis of the threat risk values of the grid cells if the threat risk value of any of the grid cells intersecting the flight path exceeds the allowable threat risk or if the cumulative threat risk along the flight path exceeds the allowable cumulative threat risk;
    step (g) further comprises calculating a cumulative threat risk along the modified flight path based upon the cumulative threat risk values of grid cells intersected by the modified flight path; and
    step (h) comprises repeating steps (e)–(g) until each grid cell intersected by the modified flight path has a cumulative threat risk value below the allowable threat risk per grid cell and the cumulative threat risk along the modified flight path is less than the allowable threat risk per path, or until said another stopping condition is met.

3. The method of claim 2, wherein said another stopping condition is one of:
    the cumulative threat risk along the modified flight path determined in a given iteration is reduced by less than a predetermined percentage compared to that from the previous iteration;
    the cumulative threat risk along the modified flight path increases compared to that from the previous iteration; and
    an aircraft constraint would be violated.

4. The method of claim 1, wherein the rule set provides that the allowable threat risk per grid cell and the allowable threat risk per path are established based upon at least one of aircraft type, mission task, and aircraft damage condition.

5. The method of claim 1, comprising:
    further repeating steps (e)–(g) using a new allowable threat risk per grid cell lower than said allowable threat risk to determine a further modified flight path with a further reduced cumulative threat risk.

6. The method of claim 1, comprising communicating the modified flight path to a computerized flight simulator.

7. The method of claim 1, comprising communicating the modified flight path to an aircraft via a transceiver.

8. The method of claim 1, comprising determining flight paths for multiple aircraft.

9. The method of claim 8, comprising modifying the allowable threat risk per grid cell for a given one of said multiple aircraft based on mission status of another one of said multiple aircraft.

10. The method of claim 8, comprising rerouting a given one of said multiple aircraft based on mission status of another one of said multiple aircraft.

11. The method of claim 8, comprising identifying a deviation in step (f) in a vertical deviation in a given iteration and identifying a deviation in step (f) in another iteration in a lateral direction.

12. A system for determining a flight path for an aircraft between an initial point and a destination point, comprising:
a memory; and
a processing unit coupled to the memory,
wherein the processing unit is configured to execute steps of:
(a) dividing an airspace encompassing an initial point and a destination point into a plurality of grid cells;
(b) identifying a flight path between the initial point and the destination point;
(c) calculating a cumulative threat risk value for each of the grid cells;
(d) establishing an allowable threat risk per grid cell based on a rule set;
(e) if the threat risk value of any of the grid cells intersecting the flight path exceeds the allowable threat risk per grid cell, identifying an intermediate point from which to deviate the flight path based upon an analysis of the cumulative threat risk values of the grid cells;
(f) identifying a deviation from the intermediate point to a new intermediate point such that the new intermediate point has a cumulative threat risk value lower than or equal to the allowable threat risk per grid cell;
(g) adjusting the flight path between the initial point and the destination point to pass through the new intermediate point, thereby providing a modified flight path; and
(h) repeating steps (e)–(g) until each grid cell intersected by the modified flight path has a cumulative threat risk value below the allowable threat risk per grid cell, or until another stopping condition is met.

13. The system of claim 12, wherein:
step (b) further comprises calculating a cumulative threat risk along the flight path based upon the threat risk values of the grid cells that intersect the flight path;
step (d) further comprises establishing an allowable threat risk per path based upon the rule set;
step (e) comprises identifying an intermediate point from which to deviate the flight path based upon an analysis of the threat risk values of the grid cells if the threat risk value of any of the grid cells intersecting the flight path exceeds the allowable threat risk or if the cumulative threat risk along the flight path exceeds the allowable cumulative threat risk;
step (g) further comprises calculating a cumulative threat risk along the modified flight path based upon the cumulative threat risk values of grid cells intersected by the modified flight path; and
step (h) comprises repeating steps (e)–(g) until each grid cell intersected by the modified flight path has a cumulative threat risk value below the allowable threat risk per grid cell and the cumulative threat risk along the modified flight path is less than the allowable threat risk per path, or until said another stopping condition is met.

14. The system of claim 13, wherein said another stopping condition is one of:
the cumulative threat risk along the modified flight path determined in a given iteration is reduced by less than a predetermined percentage compared to that from the previous iteration;
the cumulative threat risk along the modified flight path increases compared to that from the previous iteration; and
an aircraft constraint would be violated.

15. The system of claim 12, wherein the rule set provides that the allowable threat risk per grid cell and the allowable threat risk per path are established based upon at least one of aircraft type, mission task, and aircraft damage condition.

16. The system of claim 12, wherein the processing unit is configured to:
further repeat steps (e)–(g) using a new allowable threat risk per grid cell lower than said allowable threat risk to determine a further modified flight path with a further reduced cumulative threat risk.

17. The system of claim 12, wherein the processing unit is configured to communicate the modified flight path to a computerized flight simulator.

18. The system of claim 12, wherein the processing unit is configured to communicate the modified flight path to an aircraft via a transceiver.

19. The system of claim 12, wherein the processing unit is configured to determine flight paths for multiple aircraft.

20. The system of claim 19, wherein the processing unit is configured to modify the allowable threat risk per grid cell for given one of said multiple aircraft based on mission status of another one of said multiple aircraft.

21. The system of claim 19, wherein the processing unit is configured to reroute a given one of said multiple aircraft based on mission status of another one of said multiple aircraft.

22. The system of claim 12, wherein the processing unit is configured to identify a deviation in step (f) in a vertical deviation in a given iteration and to identify a deviation in step (f) in another iteration in a lateral direction.

23. A computer readable carrier containing executable instructions adapted to cause a computer to execute the method of claim 1.

* * * * *